United States Patent
Long et al.

(10) Patent No.: US 9,305,191 B2
(45) Date of Patent: Apr. 5, 2016

(54) SYSTEMS AND METHODS FOR USING A HAND HYGIENE COMPLIANCE SYSTEM TO IMPROVE WORKFLOW

(71) Applicant: Proventix Systems, Inc., Birmingham, AL (US)

(72) Inventors: Avery Dallas Long, Madison, AL (US); Harvey Allen Nix, Birmingham, AL (US); Matthew A Johnson, Tullahoma, TN (US); Romeo Maurice Burtis, Birmingham, AL (US)

(73) Assignee: PROVENTIX SYSTEMS, INC., Birmingham, AL (US)

( * ) Notice: Subject to any disclaimer, the term of this patent is extended or adjusted under 35 U.S.C. 154(b) by 0 days.

(21) Appl. No.: 13/736,945

(22) Filed: Jan. 9, 2013

(65) Prior Publication Data

US 2013/0120120 A1    May 16, 2013

Related U.S. Application Data

(63) Continuation-in-part of application No. 12/619,856, filed on Nov. 17, 2009, now Pat. No. 8,558,660.

(51) Int. Cl.
*H04Q 5/22* (2006.01)
*G06K 7/01* (2006.01)
*H04Q 9/00* (2006.01)

(52) U.S. Cl.
CPC .. *G06K 7/01* (2013.01); *H04Q 9/00* (2013.01); *H04Q 2209/47* (2013.01)

(58) Field of Classification Search
None
See application file for complete search history.

(56) References Cited

U.S. PATENT DOCUMENTS

| 6,876,303 | B2 | 4/2005 | Reeder et al. | |
|---|---|---|---|---|
| 7,734,476 | B2 | 6/2010 | Wildman et al. | |
| 8,169,327 | B2 | 5/2012 | Lynn | |
| 2005/0179538 | A1* | 8/2005 | Morita et al. | 340/539.1 |
| 2007/0080801 | A1 | 4/2007 | Weismiller et al. | |
| 2007/0257803 | A1* | 11/2007 | Munro et al. | 340/573.1 |
| 2008/0098424 | A1* | 4/2008 | Johnson | 725/37 |
| 2008/0106374 | A1* | 5/2008 | Sharbaugh | 340/5.8 |
| 2009/0090742 | A1* | 4/2009 | Yacko et al. | 222/28 |
| 2009/0224907 | A1* | 9/2009 | Sinha et al. | 340/539.11 |
| 2009/0299787 | A1 | 12/2009 | Barnhill | |
| 2010/0328076 | A1 | 12/2010 | Kyle et al. | |
| 2011/0019205 | A1 | 1/2011 | Gerber et al. | |
| 2011/0169646 | A1 | 7/2011 | Raichman et al. | |
| 2012/0154582 | A1 | 6/2012 | Johnson et al. | |
| 2014/0049465 | A1* | 2/2014 | Tremaine et al. | 345/156 |

* cited by examiner

*Primary Examiner* — Firmin Backer
*Assistant Examiner* — Brian Wilson
(74) *Attorney, Agent, or Firm* — Paul Sykes; Bradley Arant Boult Cummings LLP

(57) ABSTRACT

A hand hygiene compliance (HHC) system that, in addition to monitoring hand hygiene, provides messaging and asset tracking capabilities to improve workflow amongst employees working at a facility. In one embodiment, the HHC system includes a control unit that is associated with a hand hygiene dispenser and programmed to enable use of a menu of icons each time the control unit detects use of the hand hygiene dispenser by as individual, wherein the icons allow the individual to, without limitation, communicate, enter, obtain, or update workflow information. More specifically, the menu of icons is displayed on a feedback device associated with the control unit, and users select icons by physically touching the feedback device. Alternatively, the control unit includes a gesture sense system which allows users to select one or more icons via touch-free gestures.

4 Claims, 14 Drawing Sheets

SYSTEMS AND METHODS FOR USING A HAND HYGIENE COMPLIANCE SYSTEM TO IMPROVE WORKFLOW

CROSS REFERENCE TO RELATED APPLICATION

This application is a continuation-in-part of, and claims the benefit of and priority to, U.S. application Ser. No. 12/619,856 filed on Nov. 17, 2009.

TECHNICAL FIELD

The present disclosure relates to a hand hygiene compliance (HHC) system that, in addition to monitoring hand hygiene, provides messaging and asset tracking capabilities which allow healthcare workers to optimize their workflow and, in the process, improve the level of care they provide to each of their patients. More specifically, the HHC system includes a control unit that is associated with a hand hygiene dispenser and configured to enable use of a menu of icons each time the control unit detects a parameter indicating use of the dispenser by an individual, wherein the menu of icons allows the individual to, without limitation, communicate, enter, obtain, or update workflow information.

BACKGROUND

The issue of healthcare-associated infections (HAIs) is well known within and outside the healthcare community. To date, many studies have been conducted in an effort to ascertain effective ways to reduce the occurrence of HAIs, and the clear majority finds a thorough cleansing of one's hands upon entering and exiting a patient's room as the single most effective way to prevent the spread of HAIs. As a result, in an attempt to improve patient care, many hospitals have installed HHC systems to monitor healthcare workers' compliance with hand hygiene protocols. However, since HHC systems are limited to monitoring hand hygiene, which accounts for only one of a plurality of factors affecting patient care, the return-on-investment (ROI) for these systems has yet to be fully optimized.

Within the healthcare community, it is common for healthcare workers to spend a significant amount of time performing tasks that reduce the amount of time they can allocate to patient care. For example, a healthcare worker caring for a patient in need of an infusion pump may spend several minutes to an hour simply locating an infusion pump, which has a negative impact on patient care because the healthcare worker is unable to spend as much time caring for other patients. In an attempt to provide a solution to this problem, real-time location sensing (RTLS) systems have been developed to monitor the location of tagged assets (i.e. medical equipment, supplies, people) within a facility so healthcare workers can locate assets in a more efficient manner. Nonetheless, similar to HHC systems, the functionality of RTLS systems is limited to asset tracking, which again only accounts for one of a plurality of factors affecting patient care.

In addition to time spent locating assets, healthcare workers also spend a significant amount of time conveying task requests to other departments within a facility. For example, if a healthcare worker notices the trash needs to be changed in a patient's room, then the healthcare worker must notify environmental services either in person or via e-mail, which again reduces the amount of time the healthcare worker can allocate towards patient care. In an attempt to provide a solution to this problem, communications systems (i.e. nurse call systems) have been developed which allow hospital employees to communicate with one another anywhere in the hospital. However, the functionality of these communications systems is limited to messaging capabilities, which again only accounts for one of a plurality of factors affecting patient care.

Therefore, in order to improve patient care, different systems are needed to improve some or all of the many factors affecting patient care. Thus, there is a need for a system that combines the asset tracking capabilities of an RTLS system, the messaging capabilities of a communications system, and the hand hygiene monitoring capabilities of a HHC system.

SUMMARY

The present disclosure may address one or more of the problems and deficiencies discussed above. However, it is contemplated that the disclosure may prove useful in addressing other problems and deficiencies in a number of technical areas. Therefore, the present disclosure should not necessarily be construed as limited to addressing any of the particular problems or deficiencies discussed herein.

Embodiments of the present disclosure provide a HHC system that, in addition to monitoring hand hygiene, provides messaging and asset tracking capabilities which allow healthcare workers to optimize their workflow, and, in the process, improve the quality of care they provide to each of their patients. In a preferred embodiment, the HHC system includes a communications network capable of detecting the presence of a person having a wearable tag, preferably in the form of a Radio Frequency Identification (RFID) tag, and monitors whether the person washed his hands upon entering and exiting a patient's room. The HHC system also includes a control unit (that is, a device equipped with a sensor and communications devices) which further includes a feedback device in the form of a display and necessary hardware to detect the wearable tag and communicate with a communications network, such as a wireless computer network. Through the communications network, the control unit may communicate with devices throughout the hospital, including, without limitation, servers, tablets, PDAs, cellular phones, desktop computers at an administrator's desk or nurses' station, or any other like device now existing or hereinafter developed.

The control unit is associated with a hand hygiene dispenser and programmed to enable use of a menu of icons each time the control unit detects a parameter indicating use of the hand hygiene dispenser by a person, wherein the menu allows the person to, without limitation, communicate, enter, obtain, or update workflow information through the selection of one or more icon(s). In other words, the menu cannot receive input unless and until the person complies with hand hygiene protocols by using the dispenser. Additionally, the term "icons" is used broadly to refer to a graphic or textual element, the selection of which may execute a command, a macro, or cause a new list or menu of icons to be displayed on the feedback device.

In one embodiment, the menu is a touch-screen menu that healthcare workers use to locate assets (e.g., a person, piece of equipment or supply) having a wearable tag. As an example, upon detecting use of the hand hygiene dispenser by a healthcare worker wearing a tag, the control unit enables use of the touch-free menu which allows the healthcare worker to access an on-screen keyboard to type the name of an asset to locate. Once the healthcare worker finishes typing the name of the asset, the control unit communicates the name of the asset to a server via the communications network, and receives from the server, location information that allows the healthcare worker to locate the asset. Alternatively, in other embodiments, the control unit may include a database operable to store location information for assets and may be programmed to retrieve location from the database upon receiving a request via the on-screen keyboard.

In addition to locating tagged assets, healthcare workers can use the touch-screen menu to enter or update existing patient information. As an example, upon detecting use of the hand hygiene dispenser by a healthcare worker wearing a tag, the control unit enables use of the touch-free menu which allows the healthcare worker to indicate a patient is now a fall-risk through the selection of one or more icons displayed on the feedback device. Further, once the healthcare worker finishes selecting icons, the control unit displays a fall-risk icon on the feedback device to let others know the patient is now a fall-risk.

Still further, the touch-screen menu can also be used to assign or confirm completion of tasks. As an example, upon detecting use of the hand hygiene dispenser by a healthcare worker wearing a tag, the control unit enables the touch-screen menu which allows the healthcare worker, by selecting one or more icons displayed on the feedback device, to assign a task to environmental services to clean a patient's room. Likewise, upon using the hand hygiene dispenser, an environmental services worker wearing a tag can confirm completion of the task via the touch-screen menu.

In each of the instances discussed above, the control unit preferably is programmed to prohibit use of the touch-screen menu unless and until a person complies with hand hygiene protocols by using the dispenser. Thus, if a healthcare worker needs to access the touch-screen menu to perform a required task, then the healthcare worker must comply with hand hygiene protocols. Otherwise, the healthcare worker cannot perform her job.

In another embodiment, the menu of icons is touch-free and allows healthcare workers to select icons displayed on the feedback device without physically touching the display. More specifically, the control unit includes a gesture-sense system which includes a plurality of transmitters, a receiver, and a controller. The transmitters can be configured to transmit a light-based signal, a heat-based signal, or a sound-based signal. The receiver measures reflected signals from an object, such as a user's hand, over a predetermined amount of time to detect motion of the object. The controller is associated with the receiver and uses an algorithm to match motion of the object to one of a plurality of predefined gestures which may include, without limitation, a right swipe, left swipe, hover, or enter gesture. In the event the object's motion matches one of the predefined touch-free gestures, the controller executes an action in response to the gesture. As an example of an action, the controller may change the selection status of an icon by moving, a selection indicator (which may be represented by highlighting the icon on the menu) left or right or directly to a particular icon, or may execute the command associated with the icon, which may cause the controller to perform a function, macro, or modify the list of icons displayed on the menu.

Further, in response to detecting one or more gestures, the control unit communicates data over the communications network to the server, wherein data may include, without limitation, the icon or sequence of icons selected. Upon receiving data, a processor associated with the server is programmed to execute instructions specific to data. Alternatively, in other embodiments, the control unit may include a processor that is programmed to execute instructions specific to data.

Still further, in some embodiments, the receiver may be an ambient light sensor configured to sample ambient light levels for a room or area in which the control unit is located. As an example, a graphics processor associated with the feedback device may be programmed to interrogate the receiver for ambient light measurements via the controller at time intervals, fixed or variable. Upon receiving measurements, the graphics processor may be programmed to compare measurements to a predefined value, and, based upon said comparison, send a command to a Light Emitting Diode (LED) driver circuit to increase or decrease the backlight intensity of the feedback device.

These and other embodiments of the present disclosure will become readily apparent to those skilled in the art from the following detailed description of the embodiments having reference to the attached figures, the disclosure not being limited to any particular embodiment(s) disclosed.

DESCRIPTION

The various embodiments of the present disclosure and their advantages may be understood by referring to FIGS. 1 through 5 of the drawings. The elements of the drawings are not necessarily to scale, emphasis instead being placed upon illustrating the principles of preferred embodiments of the present disclosure. Throughout the drawings, like numerals are used for like and corresponding parts of the various drawings. The present disclosure may be provided in other specific forms and embodiments without departing from the essential characteristics as described herein. The embodiments described below are to be considered in all aspects as illustrative only and not restrictive in any manner.

As used herein, "processing workflow information" means executing instructions in response to one or more icons selected from a menu of icons displayed on a feedback device associated with a control unit, wherein the control unit or a server in communication with the control unit may be configured to process workflow information. Likewise, the following terms shall be construed in the following manner: "obtaining workflow information" means getting workflow information from a database or other device on the communications network; "entering workflow information" means receiving input from a person, wherein input is related to workflow information and includes, without limitation, entering new workflow information or updating existing workflow information; and "communicating workflow information" means to distribute workflow information to devices on the communications network or directly to a person through a communications interface, such as a feedback device on a control unit. The term "transmitters" broadly refers to any device operable to transmit a light-based, sound-based, or heat-based signal. The term "receiver" broadly refers to devices operable to measure signals reflected off an object in addition to ambient light levels in a room or area. The term "device" broadly refers to tablets, smart phones, PDAs, personal computers, servers and any other like device now existing or hereafter developed.

Figure 1:
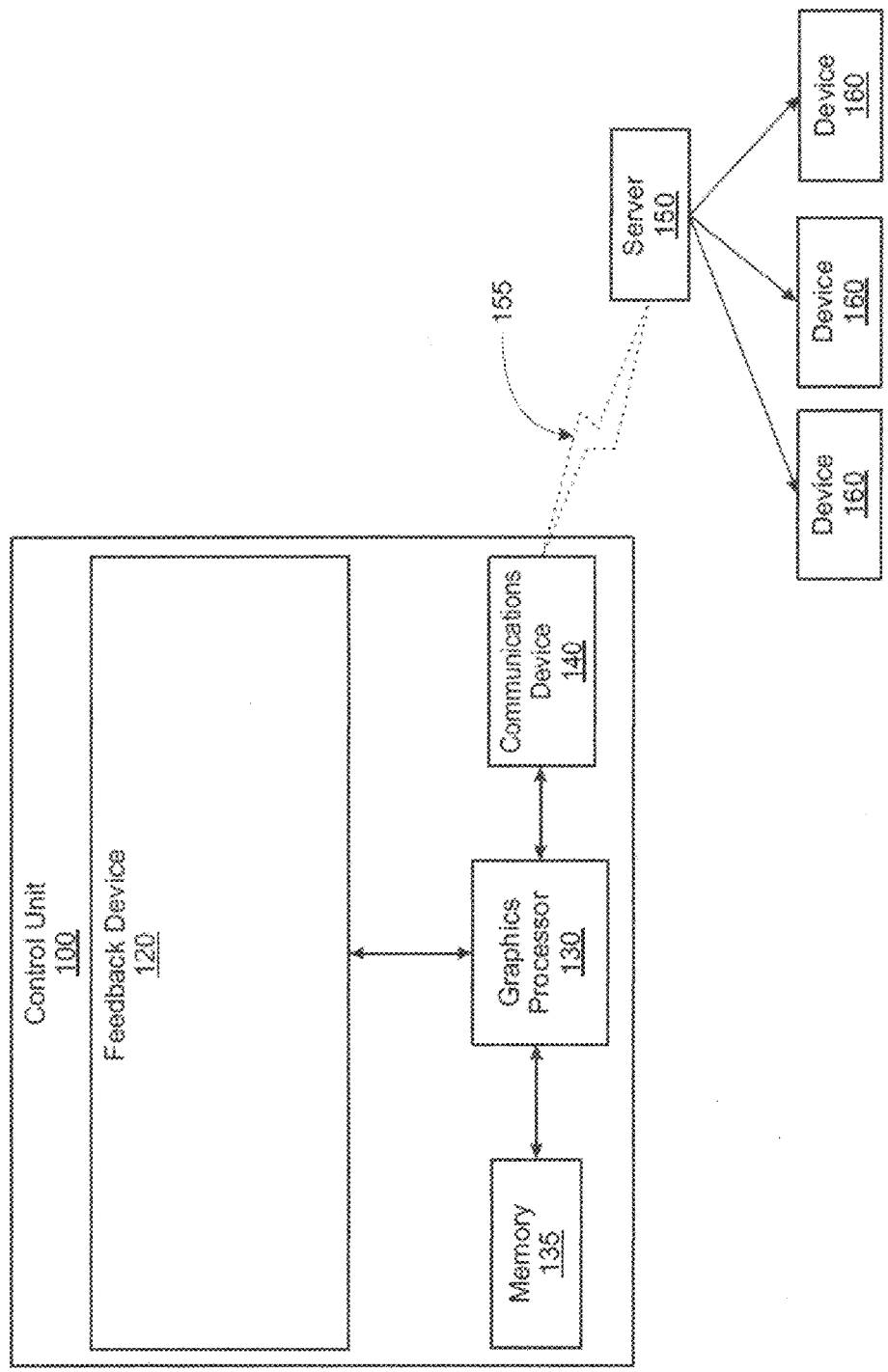
FIG. 1 is a block diagram illustrating one embodiment of a control unit associated with a HHC system in accordance with the present disclosure.

In FIG. 1, one embodiment of a control unit (100) associated with a HHC system is shown. The control unit (100) includes a feedback device (120), a graphics processor (130), a memory (135) for storing program instructions and data, and a communications device (140). More specifically, the graphics processor (130) executes program instructions to display images on the feedback device (120), while the communications device (140) communicates with a server (150) over a communications network, such as a wireless computer network. Also, although not shown, the control unit (100) includes a second communications device in the form of a Radio Frequency (RF) radio configured to receive communications from a wearable tag worn (not shown) by a person that is within a predetermined proximity of the control unit (100). Further, the control unit (100) includes a sensor (also not shown), wherein the sensor is configured to detect a parameter indicating use of a hand hygiene dispenser associated with the control unit (100). It is understood that the use of sensors (i.e. mechanical switches, electro-mechanical switches, etc.) to detect use of a hand hygiene dispenser are within the ordinary skill of a person in the field of hand hygiene monitoring. As such, this aspect of the HHC system disclosed herein will not be discussed in detail.

Figure 2:
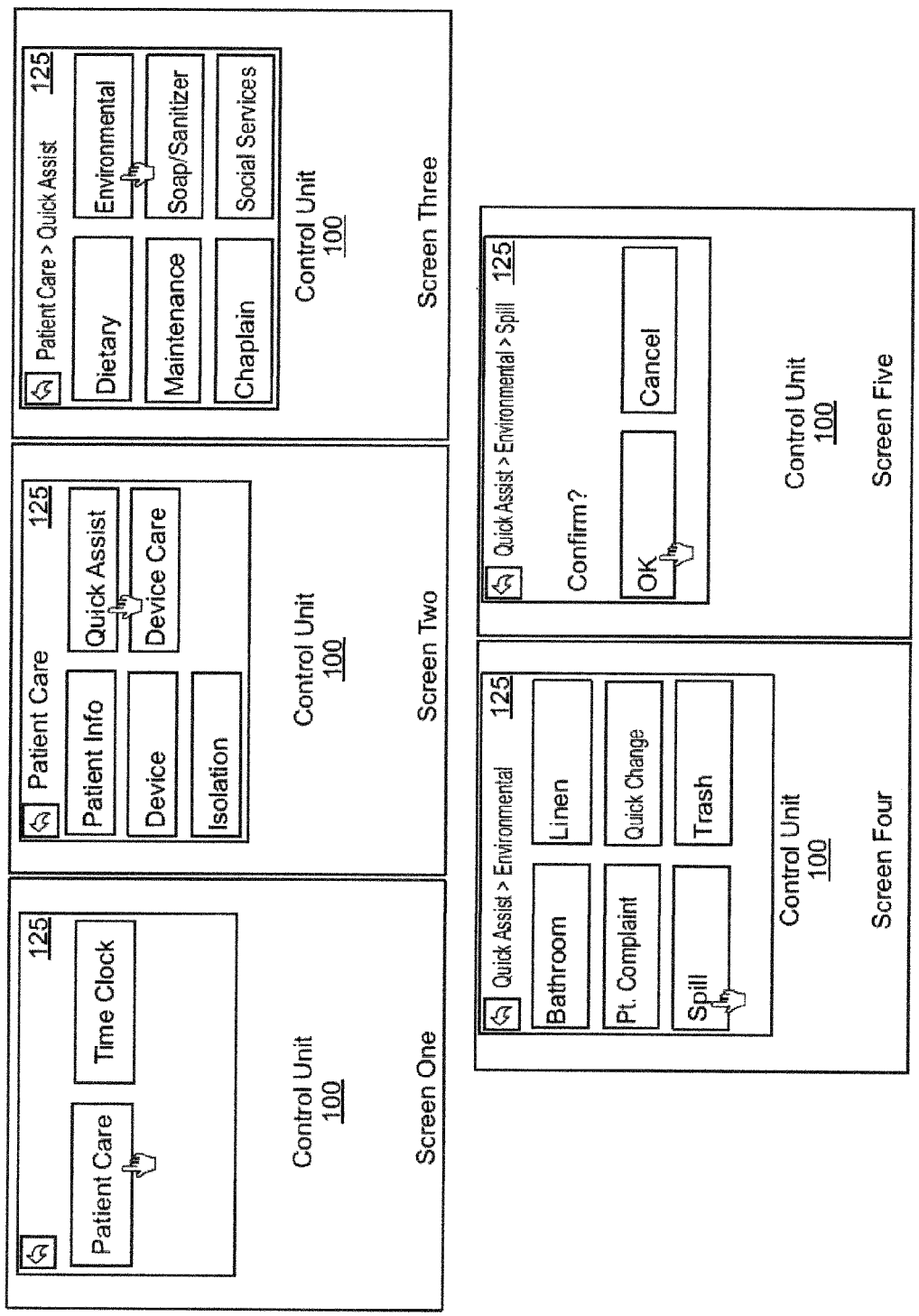
FIG. 2 depicts communication of workflow information via the selection of a sequence of icons on a touch-screen menu displayed on the feedback device shown in FIG. 1.

Referring now to FIGS. 1 and 2 in combination, upon detecting a parameter indicating use of a hand hygiene dispenser by a person wearing a wearable tag, the control unit (100) enables use of a touch-screen menu (125) on the feedback device (120). In the embodiment shown, the touch-screen menu (125) is a capacitive sense touch-screen; however, it should become apparent to one of ordinary skill in the art having the benefit of the present disclosure that other types of touch-screens are possible, such as a resistance touch-screen or a projected capacitive touch-screen. Also, examples of workflow information include, without limitation, assigning task requests, confirming completion of assigned task requests, entering or updating existing patient care information, and obtaining location information for tagged assets.

As shown in FIG. 2, a healthcare worker (not shown) selects icons on the touch-screen menu (125) to communicate a task request to environmental services to clean a spill in a patient's room. Once the healthcare worker finishes selecting icons, the graphics processor (130) communicates data to the communications device (140), wherein data may include the sequence of icons selected or just the healthcare worker's selection(s). Upon receiving data, the communications device (140) communicates data over the communications network to the server (150) via a wireless transmission (155). Alternatively, in other embodiments, the communications device (140) communicates with the server (150) over a wired communications link, such as a TCP/IP connection. Upon receiving data, a processor (not shown) associated with the server (150) processes the task request and prompts the server (150) to distribute the task request to other devices on the communications network.

In one embodiment, the server (150) communicates the task request to one or more environmental services workers that are within a predetermined proximity of the patient's room. Environmental services workers can receive the task request via a variety of communication methods and devices that are well-known within the prior art, such as e-mail, text messages, or a voicemail sent to a device (160) associated with each of the workers, such as a smartphone. In another embodiment, the server (150) communicates the task request to a plurality of control units (100), wherein, upon receiving the task request, the control units (100) display a message (i.e. the task request) on the feedback device (120) associated with each of the control units (100).

Still referring to FIGS. 1 and 2 in combination, in yet another embodiment, the server (150) communicates workflow information to a data management system (not shown) associated with a facility. More specifically, the server (150) communicates the task request over the communications network to the data management system so the data management system can communicate the task request to a specific department within the facility. For example, if a hand hygiene dispenser is out of hand sanitizer product, a healthcare worker can communicate a request for additional hand sanitizer product via the touch-screen menu (125). Upon receiving data from the communications device (140), which includes, without limitation, the icons selected, the processor (not shown) processes the request and prompts the server (150) to communicate the request over the communications network to the data management system, so the facility's central supply department, which is responsible for restocking medical supplies and equipment, can be notified.

Figure 3:
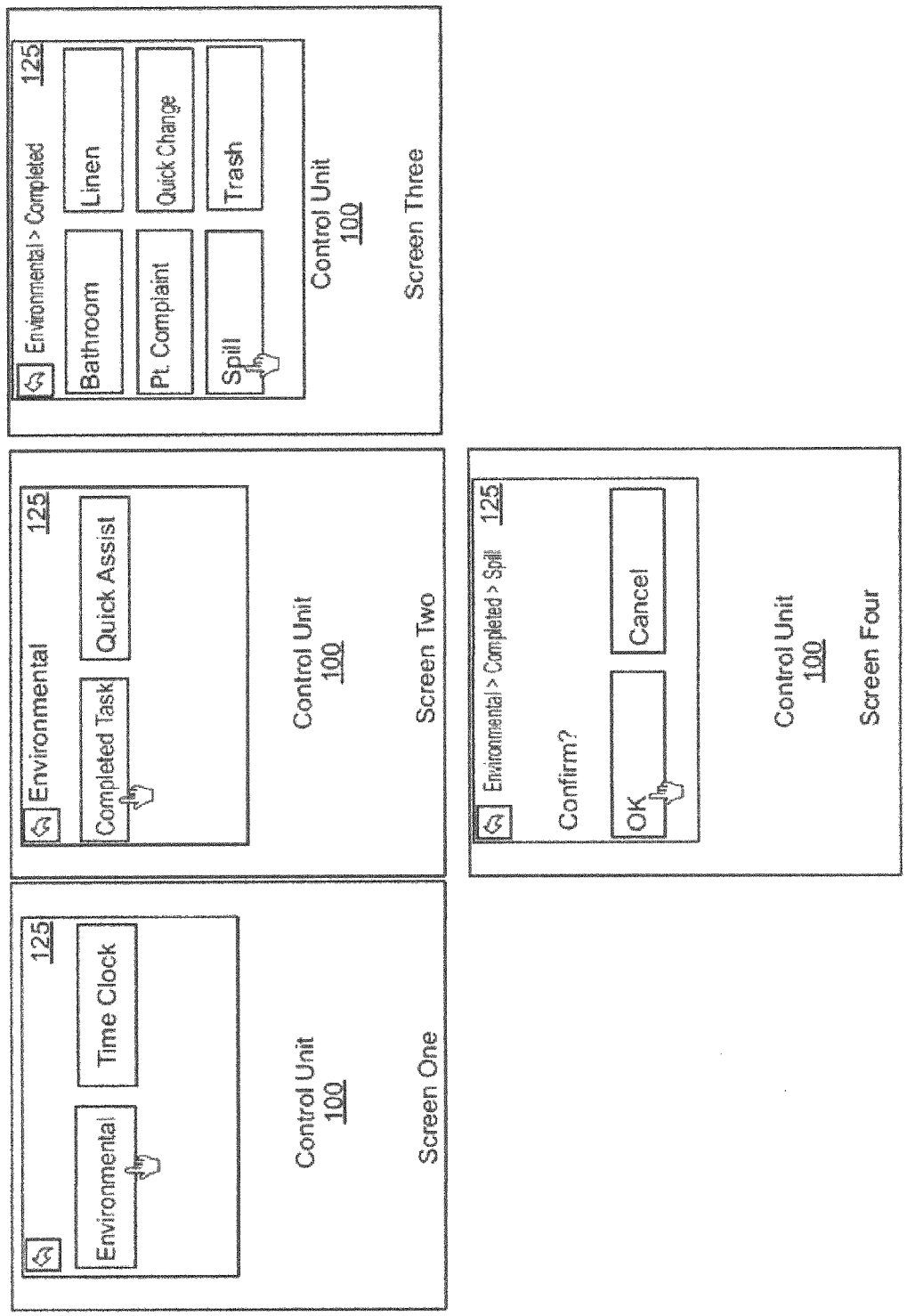
FIG. 3 depicts communication of workflow information via the selection of a sequence of icons on a touch-screen menu displayed on the feedback device shown in FIG. 1.

Referring now to FIGS. 1 and 3 in combination, upon using a hand hygiene dispenser associated with the control unit (100), an environmental services worker can communicate completion of an assigned task (i.e. cleaning up a spill in a patient's room) through the selection of one or more icons on the touch-screen menu (125). Once the environmental services worker finishes selecting icons, the graphics processor (130) sends data to the communications device, wherein data may include the sequence of icons selected, or just the environmental worker's selections. Next, the communications device (140) communicates data to the server (150) via a wired or wireless transmission (155). Upon receiving data, a processor (not shown) associated the server (150) processes workflow information and prompts the server (150) to communicate completion of the assigned task to a data management system (not shown).

Still further, in some embodiments, the processor can be configured to record a first timestamp when a healthcare assigns a task and a second timestamp when an environmental services worker completes the task in order to monitor compliance with hospital protocols for a given task. More specifically, the processor can calculate an actual response time for the task, wherein the actual response time is equal to the second timestamp minus the first timestamp, and compare the actual response time to a predefined response time assigned to the task. Alternatively, in other embodiments, the control unit (100) may be programmed or configured to monitor compliance with hospital protocols in much the same manner as described above.

Figure 4:
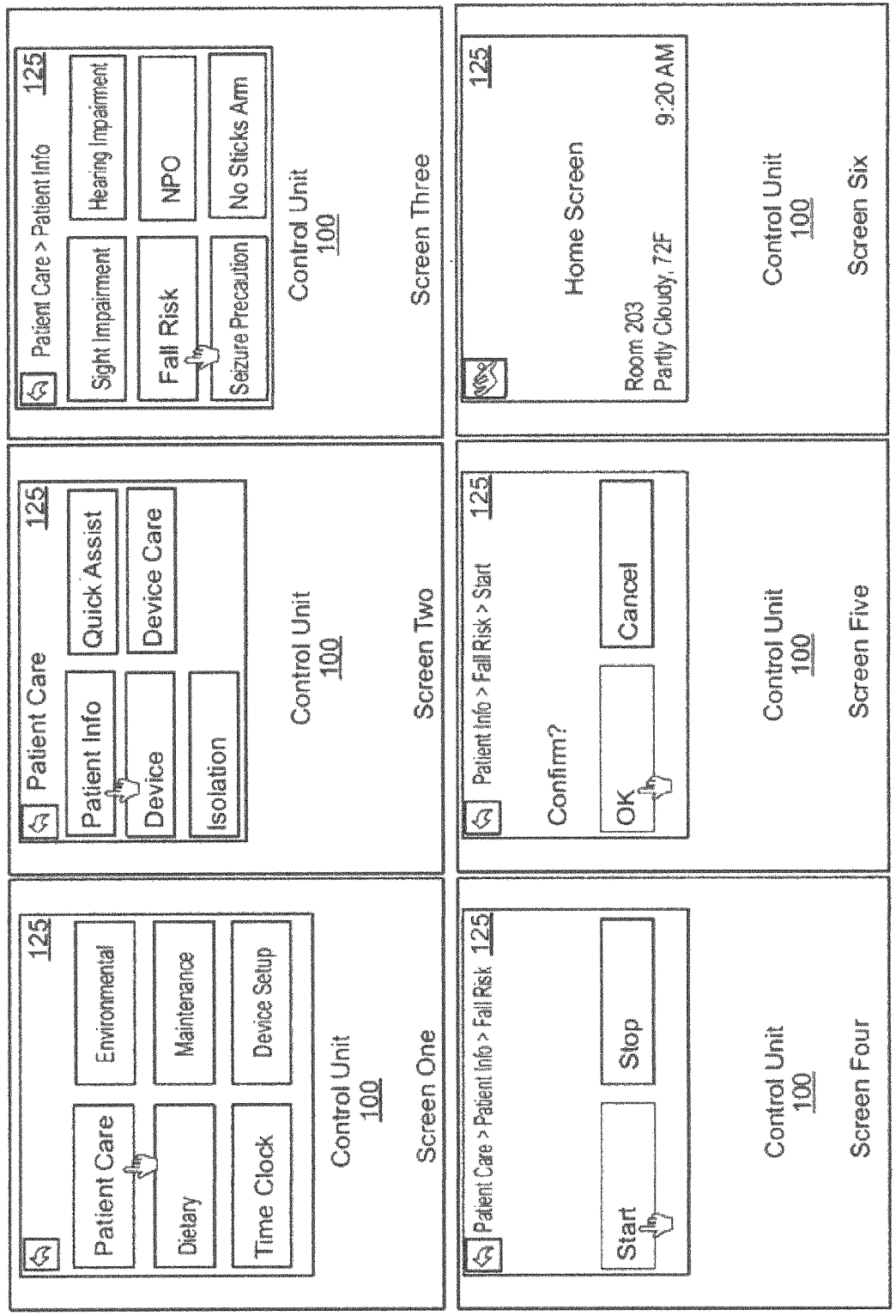
FIG. 4 depicts workflow information being updated via the selection of a sequence of icons on a touch-screen menu displayed on the feedback device shown in FIG. 1.

Referring now to FIGS. 1 and 4 in combination, healthcare workers can enter or update workflow information (that is, enter new patient condition information or update existing patient condition information) via the touch-screen menu (125). As shown in FIG. 4, after using a hand hygiene dispenser associated with the control unit (100), a healthcare worker can update existing patient care information to classify a patient as a fall risk through the selection of one or more icons on the touch-screen menu (125). Once the healthcare worker finishes selecting icons, the graphics processor (130) is programmed to display a fall risk icon on the feedback device (120) until a healthcare worker or other authorized personnel indicates the patient is no longer a fall risk.

In addition to displaying the fall risk icon on the feedback device (120), the graphics processor (130) may be programmed to send data to the communications device (140), wherein data may include the sequence of icons selected or just the selections made by the healthcare worker. Further, the communications device (140) is configured to communicate data over the communications network to the server (150) via a wired or wireless transmission (155), wherein the server (150) includes a processor operable to process workflow information and cause the server (150) to communicate updated patient care to other devices on the communications network. In one embodiment, the server (150) communicates a command to display the fall risk icon on each of a plurality of feedback devices (120) associated with each of a plurality of control units (100) located in or within a predetermined of proximity of a room in which the patient is resident. Alternatively, in other embodiments, the control unit (100) can be programmed or configured to process workflow information and communicate updated patient care information network to other devices via the communications network.

Figure 5:
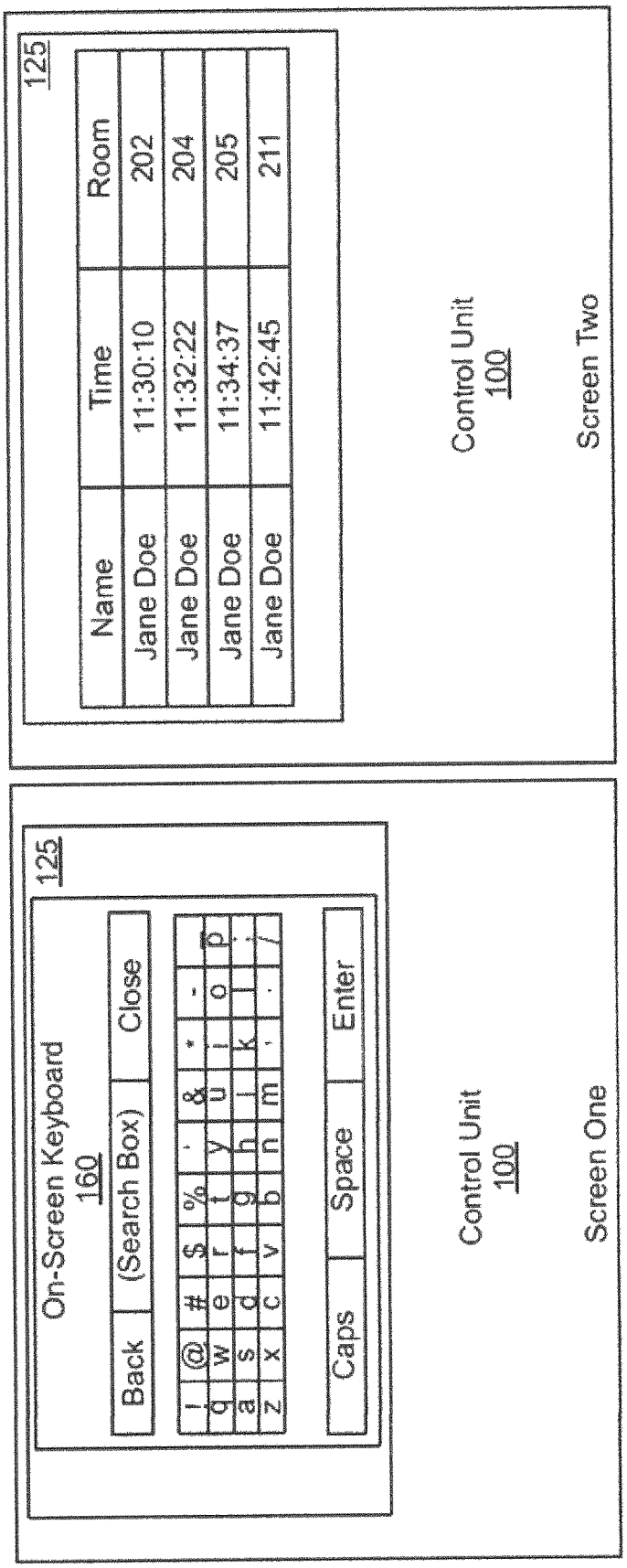
FIG. 5 depicts workflow information being obtained via an on-screen keyboard displayed on the feedback device shown in FIG. 1.

Referring now to FIGS. 1 and 5 in combination, healthcare workers can use the touch-screen menu (125) to obtain workflow information, such as location information for tagged assets within a facility, wherein tagged assets may include, without limitation, a person, a piece of equipment, or a supply. As an example, FIG. 5 depicts use of an on-screen keyboard (160) on the feedback device (120) to obtain location information for a tagged asset. More specifically, once a healthcare worker inputs the name or code of an asset, the graphics processor (130) communicates data to the communications device (140), wherein data includes the name or code of the asset to be located. Next, the communications device (140) communicates data over the communications network to the server (150) via a wired or wireless transmission (155). Upon receiving data, the server (150) determines whether the name or code matches at least one tagged asset stored in a database (not shown) associated with the server (150).

If a match is detected, the server (150) compiles location information for the asset, which includes at least a timestamp and room or area identifier associated with rooms or areas in which the asset has been detected over a predetermined interval of time. Once location information for the asset has been compiled, the server (150) communicates location information for the tagged asset over the network to the communications device (140). Next, the communications device (140) communicates location information to the graphics processor (130) which is configured to display location information on the feedback device (120). Alternatively, in other embodiments, the control unit (100) includes a database capable of storing location information for assets and is programmed to retrieve the present location of a specified asset from the database upon receiving a request via the on-screen keyboard (160).

Figure 6:
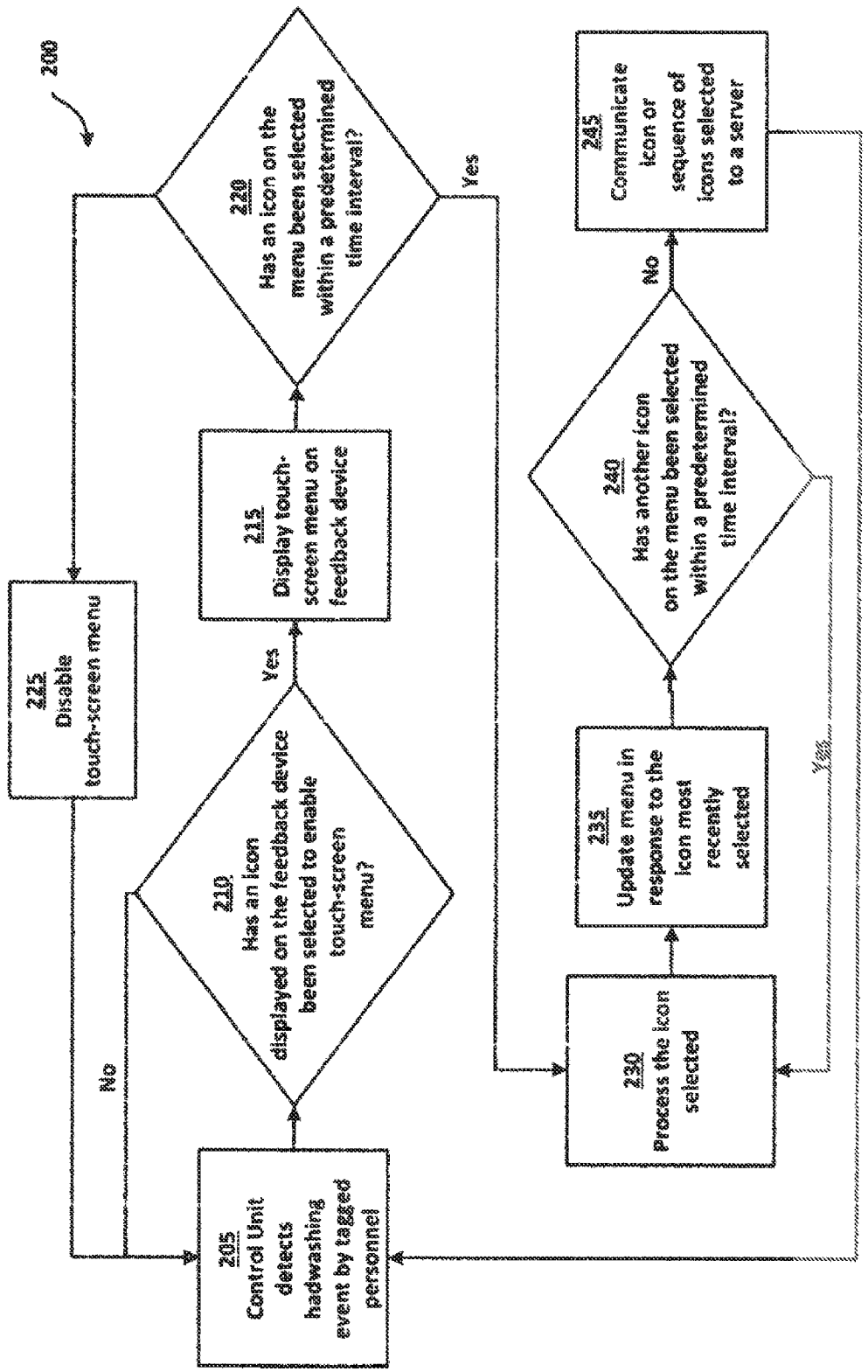
FIG. 6 is a diagram illustrating one example of a process for processing workflow information with the control unit of FIG. 1.

FIG. 6 is a control flow diagram illustrating one example of a process (200) for using the control unit (100) shown in FIG. 1 to, without limitation, communicate, enter, obtain, or update workflow information. The process (200) begins at step (205) when the control unit (110) detects use of a hand hygiene dispenser associated with the control unit (100) by a person wearing a wearable tag. At step (210), the control unit (110) enables use of touch-screen menu (125), and control branches based upon actions of the person. If an icon is not selected, then control reverts to step (205). Conversely, if an icon is selected, then control branches to step (215) and the graphics processor (130) displays the touch-screen menu (125) on the feedback device (120), wherein the menu (125) may be generic to everyone or user-specific based upon a role (i.e. nurse, doctor, environmental services, etc.) associated with the wearable tag.

At step (220), control branches again based upon actions of the person. If an icon on the touch-screen menu (125) is not selected within a predetermined interval of time, then control branches to step (225) and the control unit (110) disables use of the touch-screen menu (125). Conversely, if an icon on the touch-screen menu (125) is selected within the predetermined interval of time, then control branches to step (230) and, as a response to the icon most recently selected, the graphics processor (130) performs a function, macro, or generates a new list of icons to display on the feedback device (120). At step (235), the graphics processor (130) updates the touch-screen menu (125) in response to the icon most recently selected. At step (240), control branches again based upon actions of the person. If additional icons are selected, then iterations of steps (230) and (235) are executed until a predetermined interval of time passes without an icon being selected. Once this condition is satisfied, control branches to step (245) and the communications device (140) communicates data over the communications network to the server (150), wherein the server (150) processes workflow information. Alternatively, in other embodiments, the control unit (100) may be programmed or configured to process workflow information.

Figure 7:
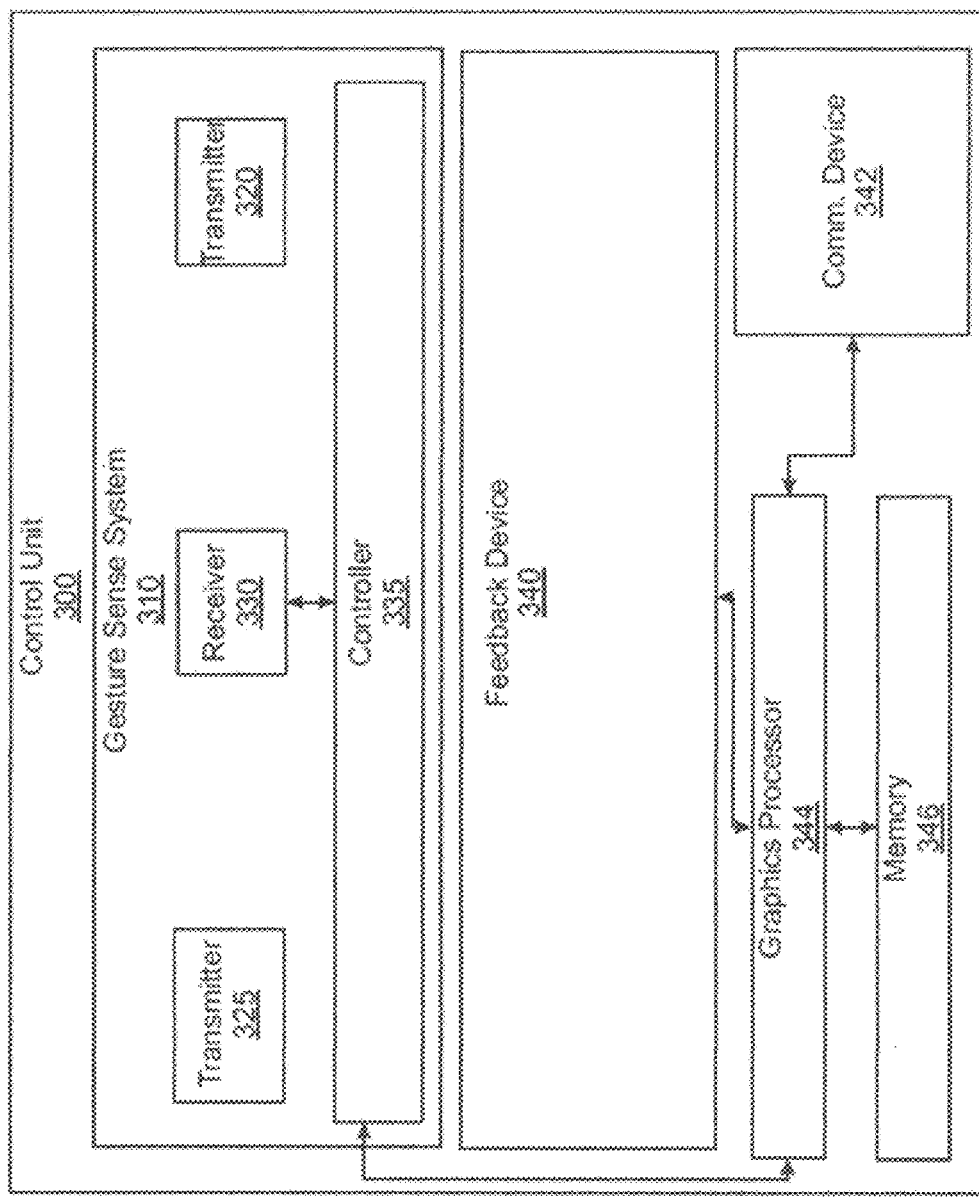
FIG. 7 is a block diagram illustrating a second embodiment of a control unit associated with a HHC in accordance with the present disclosure.
Figure 8:
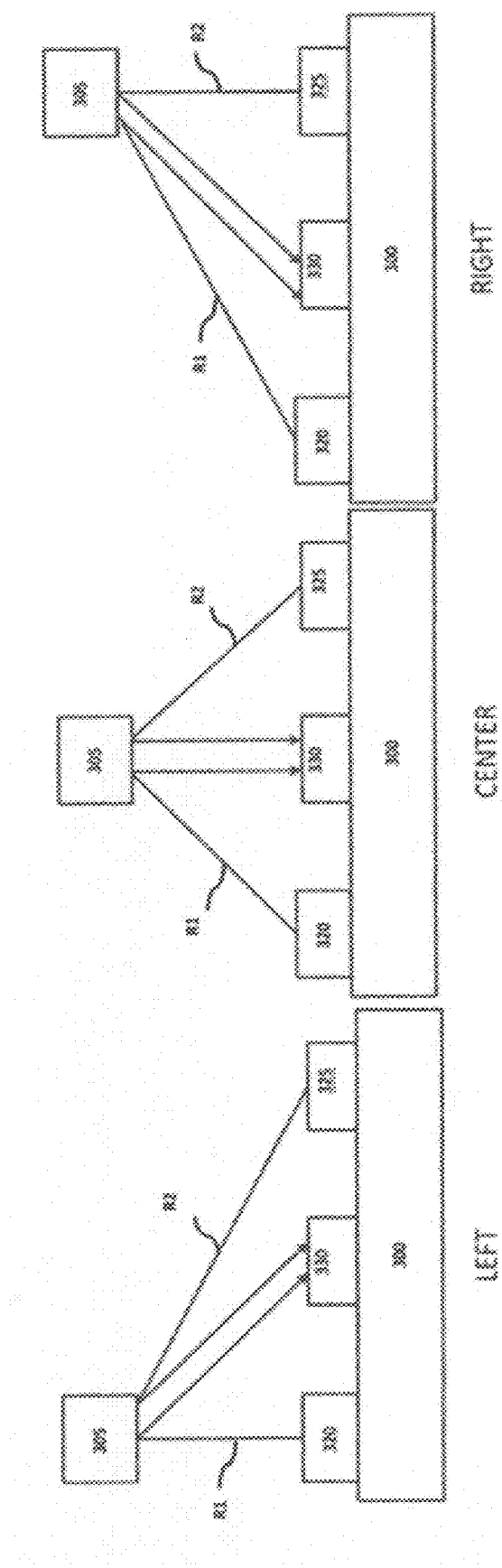
FIG. 8 is a side view of the gesture sense system of FIG. 3 detecting movement of an object.

FIG. 7 depicts a block diagram for one embodiment of a control unit (300) associated with a HHC system. The control unit (300) includes a gesture-sense system (310), a feedback device (340), a communications device (342), a graphics processor (344), and a memory (346). The gesture-sense system (310) includes a plurality of transmitters (320), (325), a receiver (330), and a controller (335). Referring now to FIG. 8, a side view of the gesture sense system (310) shown in FIG. 7 is shown. In this embodiment, the receiver (330) and transmitters (320), (325) are independently activated, and the receiver (330) detects reflected signals R1 and R2, respectively from an object (305). The amplitude of the reflected light signals R1 and R2 are measured by the receiver (330). It is assumed that the strength of the reflected signal represents the distance of the object from the gesture sense system (310). The receiver (330) converts reflectance measurements to digital values that are stored by the controller (335), and measurements are repeated under the control of the controller (335) at time intervals, fixed or variable. The measurements taken at each time interval are compared to determine position of the object in the X-axis, and the measurements between time intervals are compared by the controller (335) to determine motion of the object or lack thereof, which can be interpreted as a touch-free gesture.

By recording the ratio of R1 to R2 as well as the amplitude of R1 and R2, the controller can detect motion of the object (305) towards or away from the gesture sense system (310). For example, if the ratio of R1 to R2 remains substantially the same over a series of measurements, but the amplitude measured for R1 and R2 increase or decrease, then the controller (335) interprets this as motion towards the gesture sense system (310) or away fro the gesture sense system (310), respectively. As follows, motion of the object (305) towards the gesture sense system (310) is interpreted by the controller (335) as an enter gesture used to select an icon on a menu of icons displayed on the feedback device (340). Further, as discussed in more detail below, in addition to detecting motion in the Z-axis, the gesture sense system (310) is operable to detect motion of the object (305) in both the X and Y-axis.

As an example, a positive motion in the X-axis can be interpreted as a right swipe, while a negative motion in the X-axis can be interpreted as a left swipe. Likewise, positive motion in the Z-axis can be interpreted as an enter gesture, and, although not shown, it is understood that one or more of the transmitters (320), (325) may be positioned along the Y-axis, rather than along the X axis, to detect vertical motion of an object. The rate of movement may also be measured. For example, a higher rate of movement may correspond to a fast scroll while a slower rate of movement may correspond to a slow scroll. Further, once the controller (335) correlates the object's motion to one of a plurality of predefined touch-free gestures, the controller (335) sends a command to the graphics processor (344) to execute a function, macro, or modify the list of icons on a touch-free menu, a process discussed in more detail below.

Alternatively, in another embodiment, the control unit may be equipped with a capture device in the form of a camera, which may be used to visually monitor motion of a user. Further, the control unit may be programmed (i.e. image or motion recognition software) to interpret motion of the user as controls that can be used to affect a touch-free menu displayed on a feedback device associated with the control unit. As such, a user may use her movements to navigate to or select one or more icons on the touch-free menu. In this particular embodiment, the control unit is programmed to enable the camera only after detecting use of a hand hygiene dispenser associated with the control unit. In other words, the user must comply with hand hygiene protocols before gaining access to the touch-free menu.

Figure 9:
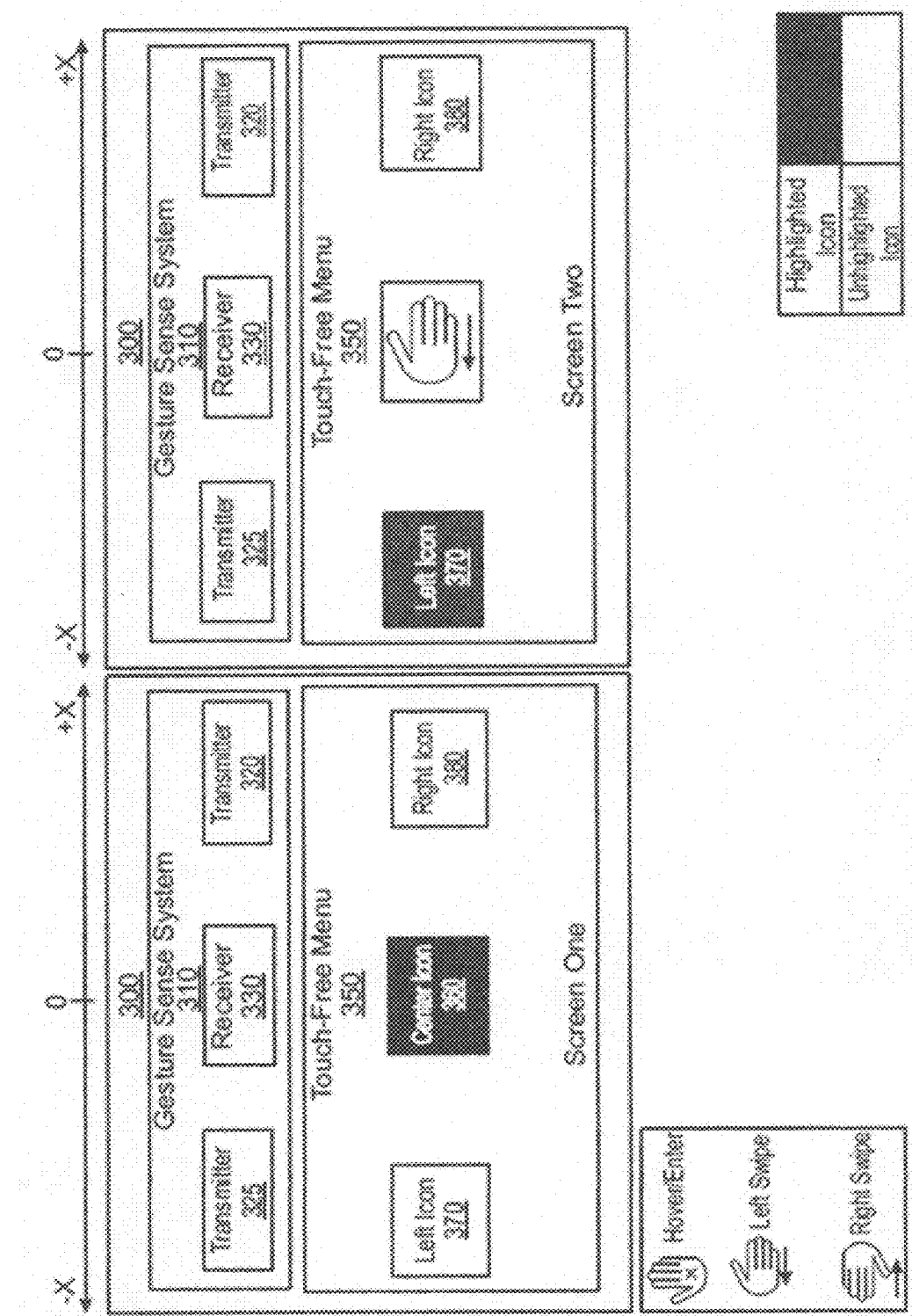
FIG. 9 shows a touch-free menu updating as the control unit of FIG. 3 detects a touch-free gesture.
Figure 10:
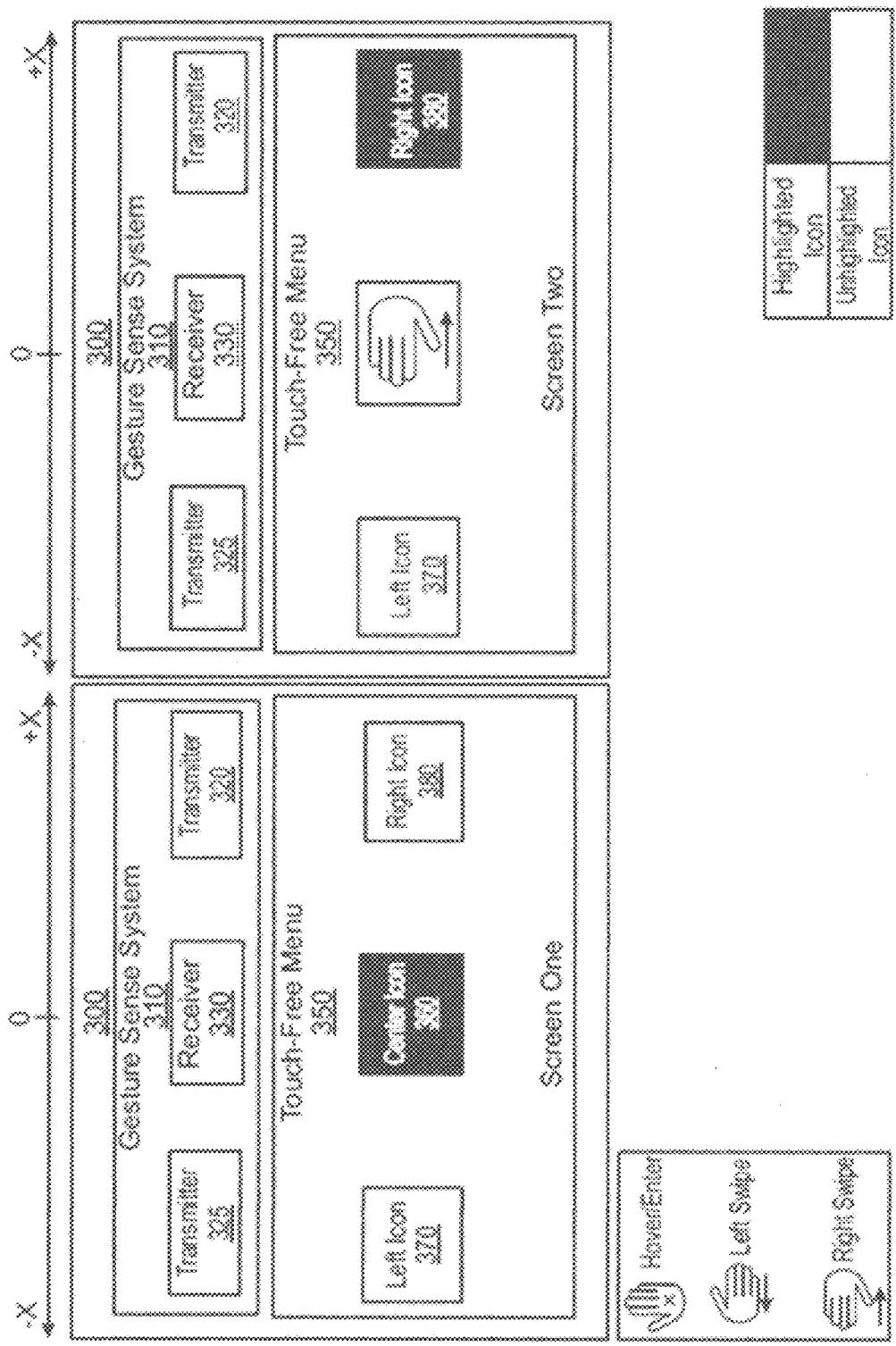
FIG. 10 shows a touch-free menu updating as the control unit of FIG. 3 detects a touch-free gesture.

Referring now to FIG. 9 with additional reference to FIG. 7, if the receiver (330) records a series of position measurements of +X, 0, and −X sequentially in time for a person's hand, the controller (335) recognizes the right to left motion of the person's hand as a left swipe, which the controller (335) interprets as a command to scroll left on a touch-free menu (350) displayed on the feedback device (340). As follows, the controller (335) sends a command to the graphics processor (344) to shift a selection indicator from a center icon (360) to a left icon (370). Similarly, as shown in FIG. 10, if the receiver (330) records a series of position measurements of −X, 0, +X, the controller (335) recognizes the left to right motion as a right swipe, which the controller (335) interprets as a command to scroll right on the touch-free menu (350). As follows, the controller (335) sends a message to the graphics processor (344) to shift the selection indicator from the center icon (360) to a right icon (380).

Figure 11:
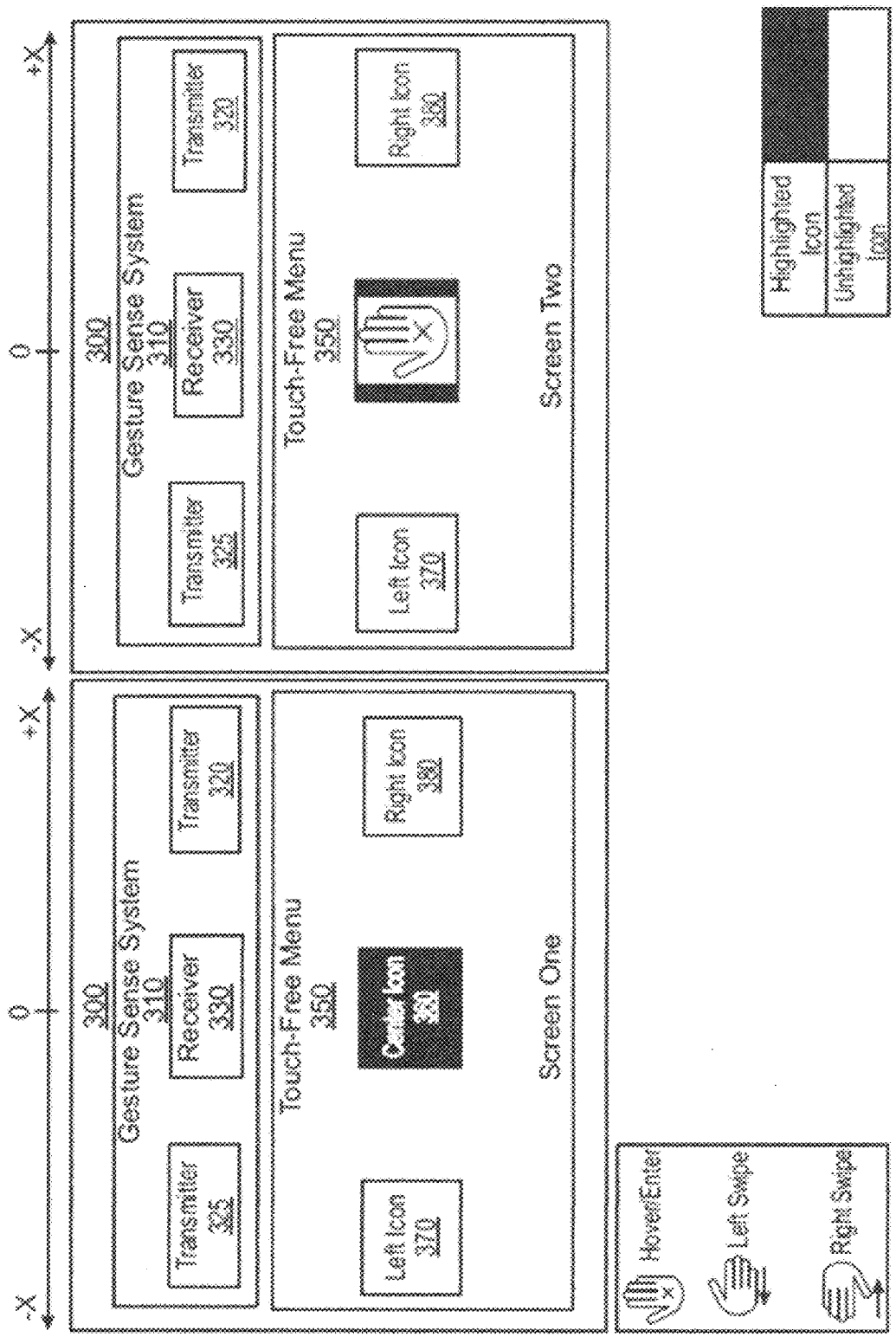
FIG. 11 shows a touch-free menu updating as the control unit of FIG. 3 detects a touch-free gesture.
Figure 12:
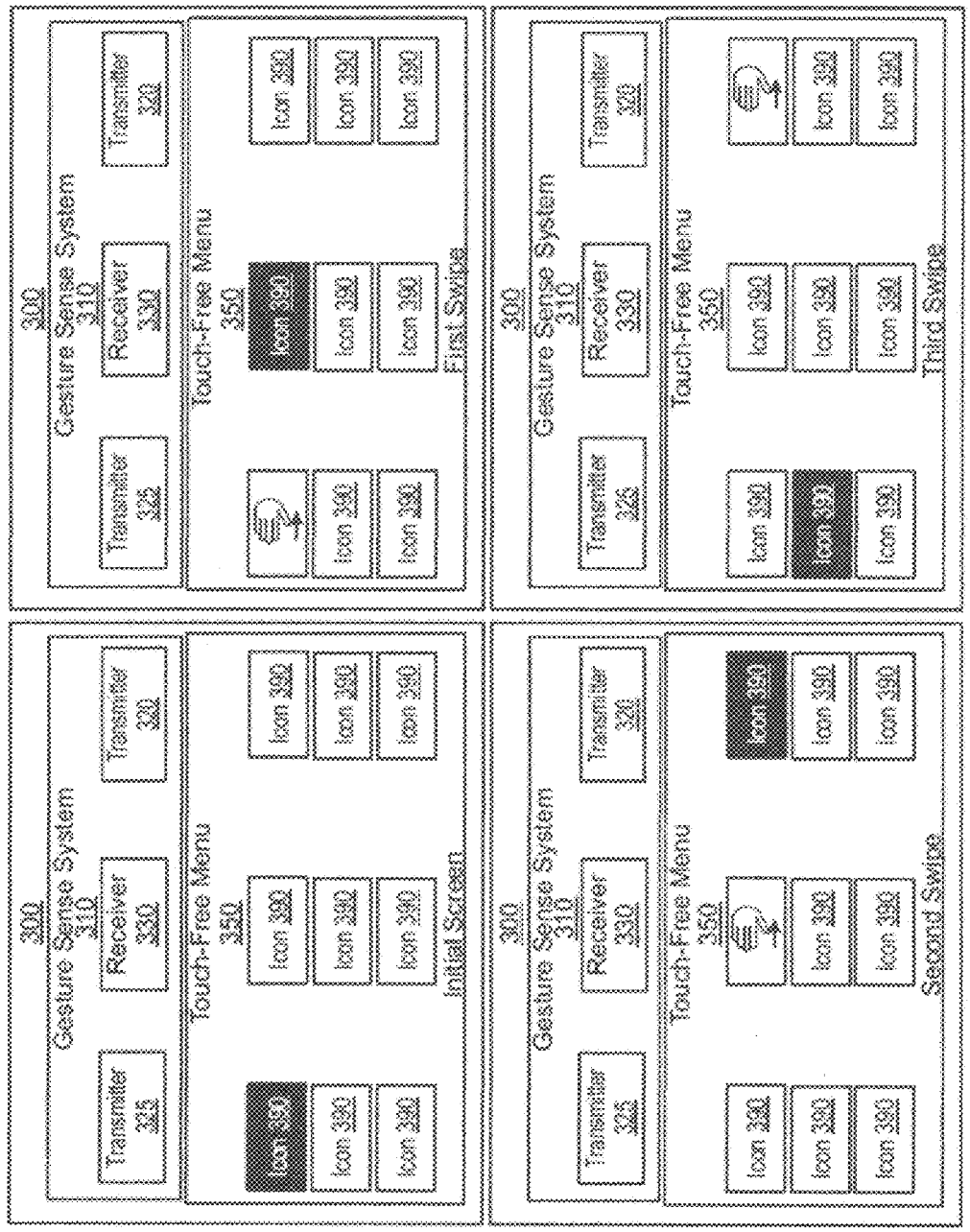
FIG. 12 shows a touch-free menu updating as the control unit of FIG. 3 detects a series of touch-free gestures.

In addition to monitoring motion of an object in the x-axis, distance of the object from the control unit (300) may be determined using the gesture sense system (310). If the magnitude of reflectance measurements increase over time, the controller (335) interprets the increase in magnitude as the person's hand moving towards the gesture sense system (310). Likewise, if the magnitude of reflectance measurements decrease over time, the controller (335) interprets the decrease as the person's hand moving away from the gesture sense system (310). As shown in FIG. 11, when the controller (335) interprets an object's movement towards the control unit (300) as an enter gesture, the controller (335) sends a command to the graphics processor (344) to select whatever icon the selection indicator is currently on, which in the embodiment shown is the center icon (360). Additionally, whenever an icon is selected, the graphics processor (344) performs a function, macro, or modifies the list of icons on the touch-free menu (350) in response to the icon most recently selected. In an effort to reduce the amount of time a person must wait for the touch-free menu (350) to update in response to an icon they selected, lists of icons may be stored in memory (346) and accessed directly by the graphics processor (344). Further, FIG. 12 demonstrates the ability to navigate through multiple rows of icons (390) via a series of a touch-free gestures.

Figure 13:
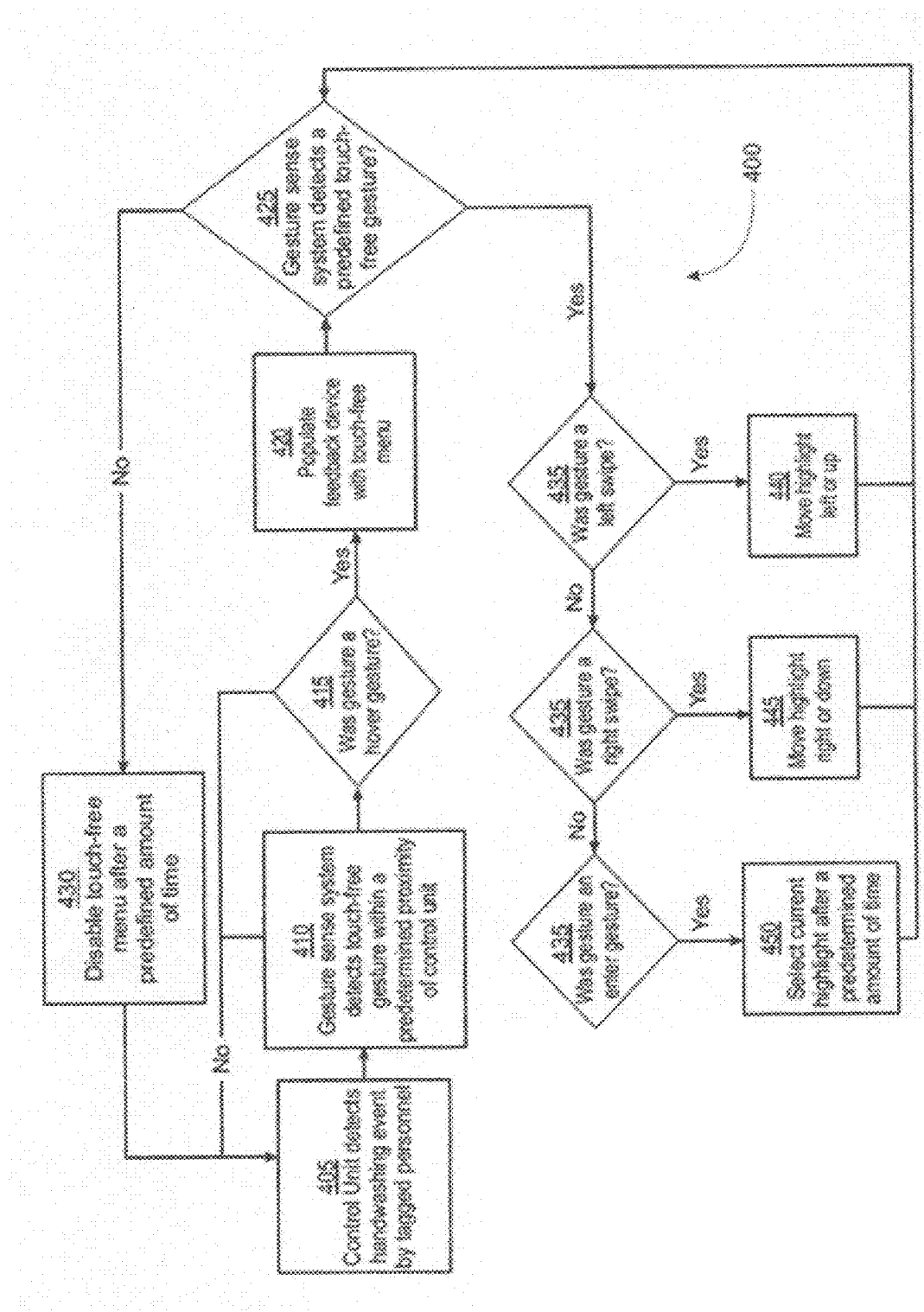
FIG. 13 shows a diagram illustrating an example of a process for processing touch-free gestures with the control unit of FIG. 3.

FIG. 13 is a control flow diagram illustrating one example of a process (400) for using the control unit (300) shown in FIG. 3 to, without limitation, communicate, enter, obtain, or update workflow information. At step (405), the process (400) begins when the control unit (300) detects use of a hand hygiene dispenser associated with the control unit (300) by a person wearing a wearable tag. Next, at step (410), control branches based upon actions of the person. If the gesture sense system (310) does not detect a touch-free gesture, then control branches to step (405). Conversely, if the gesture sense system (310) detects a touch-free gesture, then control branches to step (415).

At step (415), if the gesture matches one of a plurality of predefined gestures, then control proceeds to step (420) and the controller (335) sends a message to the graphics processor (344) to display the touch-free menu (350) on the feedback device (340). Next, at step (425), control branches based upon actions of the person. If a second touch-free gesture is not detected by the gesture sense system (310), control branches to step (430) and the control unit (300) disables use of the touch-free menu (350) after a predetermined interval of time. Conversely, if a second touch-free gesture is detected, then control branches to step (435).

At step (435), control branches again according to which predefined touch-free gesture the controller (335) matches with the second touch-free gesture. If the second touch-free gesture is a left swipe, then the controller (335) sends a message to the graphics processor (344) at step (440) to shift a selection indicator left or up on the touch-free menu. If the second touch-free gesture is a right swipe, then the controller (335) sends a message to the graphics processor (344) at step (445) to shift the selection indicator right or down. If the second touch-free gesture is an enter gesture, then the controller (335) sends a message to the graphics processor (344) at step (450) to select whatever icon is currently highlighted by the selection indicator. It is understood that any combination of steps (440), (445), and (450) may occur until a predetermined interval of time passes during which the gesture-sense system (310) is unable to detect a touch-free gesture that matches one of the predefined gestures in step (435). When this end condition is met, control reverts to step (430).

Figure 14:
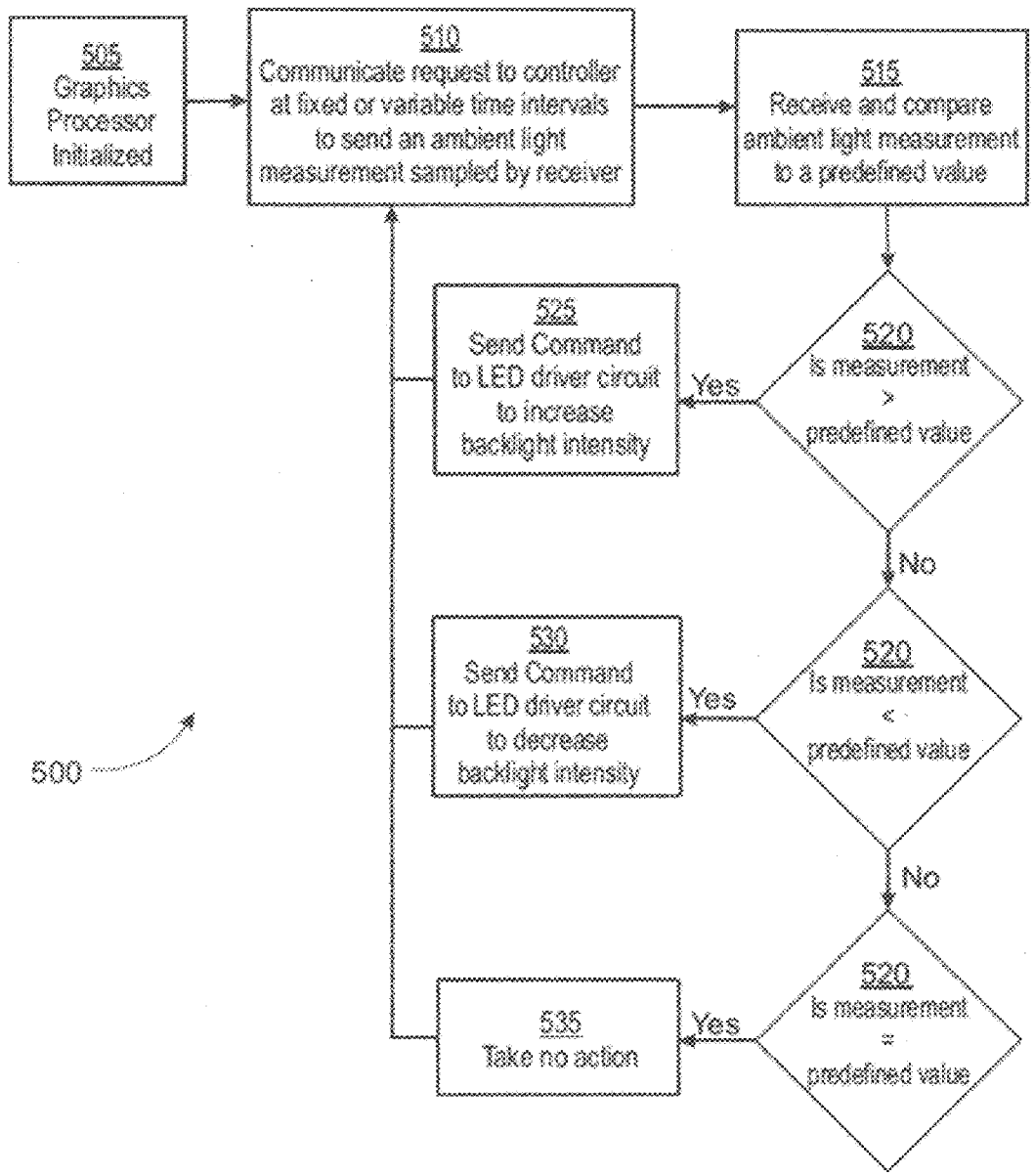
FIG. 14 shows a control flow diagram illustrating one example of a process for controlling backlight intensity of the feedback device of FIG. 3.

FIG. 14 is a control flow diagram illustrating one example of a process (500) for using the control unit (300) shown in FIG. 3 to control the backlight intensity of its feedback device (320). The process (500) involves measuring ambient light levels with the gesture sense system (310) shown in FIG. 7. At step (505), the graphics processor (344) is initialized. Next, at step (510), the graphics processor (344) communicates a request to the controller (335) at fixed or variable time intervals to send an ambient light measurement sampled by the receiver (330), which is operable to measure ambient light levels for a room or area in which the control unit (300) is located. At step (515), the graphics processor (344) receives and compares the ambient light measurement to a predefined value. At step (520), the graphics processor (344) selects from one of three actions based upon the comparison made at step (515). If the ambient light measurement is greater than the predefined value, control branches to step (525) and the graphics processor sends a command to a Light Emitting Diode (LED) driver circuit (not shown) to increase the backlight intensity of the feedback device (320). If the ambient light measurement is less than the predetermined value, the graphics processor (344) sends a command to the LED driver circuit to decrease the backlight intensity of the feedback device (320). If the ambient light measurement is equal to the predefined value, the graphics processor (344) takes no action with regards to the backlight intensity of the feedback device (320). After the graphics processor (344) performs step (525), (530), or (535), control reverts to step (510).

The use of the terms "a" and "an" and "the" and similar referents in the context of describing the present disclosure (especially in the context of the following claims) are to be construed to cover both the singular and the plural, unless otherwise indicated herein or clearly contradicted by the context. The use of any and all examples, or exemplary language (e.g., "such as") provided herein, is intended merely to better illuminate the present disclosure and does not pose a limitation on the scope of the disclosure unless otherwise claimed. Also, no language in the specification should be construed as indicating any non-claimed element as essential to practicing the present disclosure.

Further, one of ordinary skill in the art will recognize that a variety of approaches for communicating workflow information with a HHC system may be employed without departing from the teachings of the present disclosure. Therefore, the foregoing description is considered in all respects to be illustrative and not restrictive.

The invention claimed is:

1. A control unit associated with a hand hygiene compliance system, the control unit comprising:
 a sensor to detect use of a hand hygiene dispenser by a person, wherein the hand hygiene dispenser is associated with the control unit;
 a feedback device configured to display a menu of icons in response to the sensor detecting use of the hand hygiene dispenser, the menu of icons representative of instructions a processor is programmed to execute in order to allow the person to enter or update patient care information;
 a communications device operable to communicate with a communications network associated with the hand hygiene compliance system; and
 a gesture sense system configured to process one or more touch-free gestures made by the person in order to communicate a selection of one or more icons on the menu of icons, wherein the selection of one or more icons represents the patient care information, and the gesture sense system further includes:
  a first transmitter and a second transmitter, wherein, in response to the sensor detecting use of the hand hygiene dispenser, the first and second transmitter are activated to transmit a light signal over a predetermined area;
  a receiver positioned between the first transmitter and the second transmitter, the receiver configured to detect a plurality of first reflectance measurements by measuring an amplitude of light reflected from the person's hand relative to the first transmitter, and a plurality of second reflectance measurements by measuring an amplitude of light reflected from the person's hand relative to the second transmitter, wherein each of the first reflectance measurements and each of the second reflectance measurements correspond to a different point in time; and
  a controller in communication with the receiver, the controller configured to compare the plurality of first and second reflectance measurements to identify a plurality of ratio values between the first reflectance measurements and the second reflectance measurements, and from the plurality of ratio values, determine at least one of a position and a direction of movement of the person's hand relative to the first and second transmitter.

2. The control unit of claim 1, wherein the controller is configured to match the one or more touch-free gestures made by the person within the predetermined area to one of a plurality of pre-defined touch-free gestures.

3. The control unit of claim 1, wherein the receiver is an ambient light sensor operable to measure an ambient light level in a room or area in which the control unit is located.

4. The control unit of claim 3, wherein the controller compares the ambient light level of the room or area against a predetermined value and, based upon said comparison, communicates commands to a graphics processor associated with the control unit to adjust luminous intensity of a backlight for the feedback device.

* * * * *